United States Patent
Moniz et al.

(10) Patent No.: US 10,563,342 B2
(45) Date of Patent: Feb. 18, 2020

(54) SYSTEMS AND METHODS FOR LIQUID-BASED LINT COLLECTION

(71) Applicant: WHIRLPOOL CORPORATION, Benton Harbor, MI (US)

(72) Inventors: Victor A. Moniz, Fall River, MA (US); Daniel Eugene Quinn, Fall River, MA (US); Justin William Sampson, Fall River, MA (US); Bruce R. Villella, Johnston, RI (US)

(73) Assignee: Whirlpool Corporation, Benton Harbor, MI (US)

( * ) Notice: Subject to any disclaimer, the term of this patent is extended or adjusted under 35 U.S.C. 154(b) by 414 days.

(21) Appl. No.: 14/972,358

(22) Filed: Dec. 17, 2015

(65) Prior Publication Data

US 2016/0177496 A1 Jun. 23, 2016

Related U.S. Application Data

(60) Provisional application No. 62/096,326, filed on Dec. 23, 2014.

(51) Int. Cl.
*D06F 58/22* (2006.01)
*B01D 47/06* (2006.01)

(52) U.S. Cl.
CPC ............. *D06F 58/22* (2013.01); *B01D 47/06* (2013.01)

(58) Field of Classification Search
CPC ................................ D06F 58/22; B01D 47/06
See application file for complete search history.

(56) References Cited

U.S. PATENT DOCUMENTS

| | | | |
|---|---|---|---|
| 1,530,073 A | | 4/1920 | Cutter |
| 1,543,941 A | * | 6/1925 | Mathesius .............. B01D 47/06 261/111 |
| 2,399,629 A | * | 5/1946 | Fisher ..................... B24B 55/06 261/DIG. 54 |
| 2,825,148 A | | 6/1955 | Olson |
| 2,959,044 A | | 11/1960 | Stone |
| 3,132,005 A | * | 5/1964 | McMillan ............... D06F 58/24 34/569 |
| 5,226,203 A | | 7/1993 | Sacconato et al. |
| 5,628,122 A | * | 5/1997 | Spinardi ................. D06F 58/22 137/132 |
| 6,671,977 B2 | | 1/2004 | Beaumont |
| 8,266,814 B2 | | 9/2012 | Grunert |
| 8,438,750 B2 | | 5/2013 | Dittmer et al. |
| 8,615,895 B2 | | 12/2013 | Shin et al. |
| 2004/0187343 A1 | | 9/2004 | Beaumont |
| 2007/0101603 A1 | | 5/2007 | Beaumont |
| 2013/0008049 A1 | | 1/2013 | Patil |
| 2014/0026433 A1 | | 1/2014 | Bison et al. |
| 2014/0165415 A1 | | 6/2014 | Tarifi |

FOREIGN PATENT DOCUMENTS

DE 4212965 A1 * 10/1993 ............. D06F 58/24

* cited by examiner

*Primary Examiner* — Jessica Yuen
(74) *Attorney, Agent, or Firm* — Price Heneveld LLP

(57) ABSTRACT

A screen-free, liquid-based lint collection system is disclosed. The system comprises an initial air-lint conduit. The air-lint conduit is coupled to a lint collection reservoir. The system further comprises a spray assembly and a sensor. The spray assembly is configured to spray a liquid into the lint-collection reservoir. The sensor monitors the level of the liquid collected in the lint-collection reservoir.

11 Claims, 10 Drawing Sheets

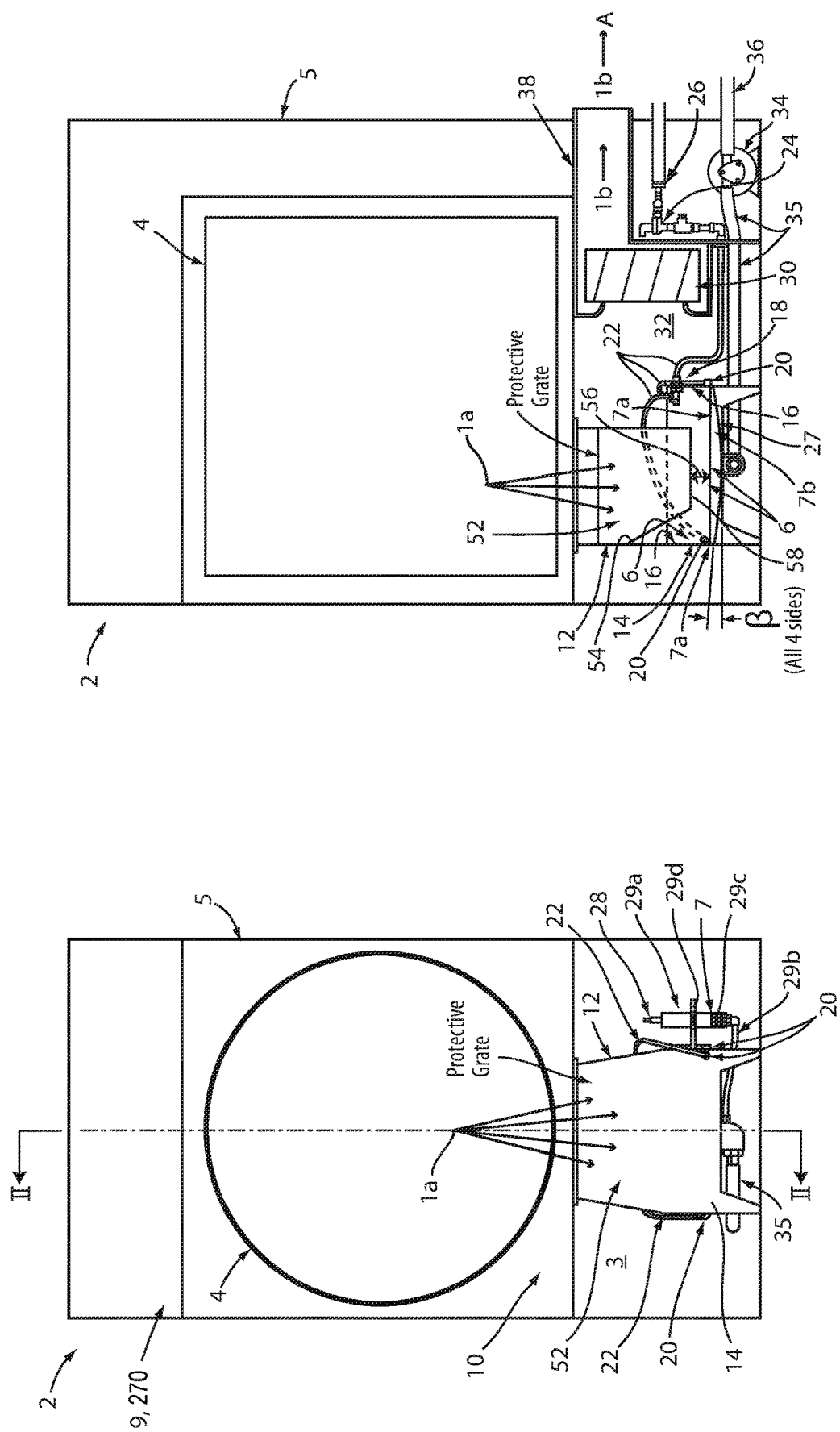

SYSTEMS AND METHODS FOR LIQUID-BASED LINT COLLECTION

CROSS-REFERENCE TO RELATED APPLICATIONS

The present application claims the benefit of priority under 35 USC § 119(e) to U.S. Provisional Patent Application 62/096,326 filed Dec. 23, 2014, which is hereby incorporated by reference in its entirety.

FIELD OF THE INVENTION

The field of the invention relates to lint collection systems and more particularly to liquid-based lint collection systems for clothes dryers.

SUMMARY OF THE INVENTION

According to one aspect of the present disclosure, a screen-free, liquid-based lint collection system is disclosed. The system comprises an initial air-lint conduit. The air-lint conduit is coupled to a lint collection reservoir. The system further comprises a spray assembly and a sensor. The spray assembly is configured to spray a liquid into the lint-collection reservoir. The sensor monitors the level of the liquid collected in the lint-collection reservoir.

According to another aspect of the present disclosure, a screen-free, liquid-based lint collection system is disclosed. The system comprises a system chamber, having an inlet that receives an air-lint combination. The chamber defines an interior having a reservoir section and an air flow area. The system further comprises an interior conduit, a spray assembly, and a sensor. The interior conduit is disposed within the system chamber. The spray assembly sprays liquid into the reservoir section, and the sensor monitors the level of the liquid collected in the reservoir section.

According to yet another aspect of the present disclosure, a clothes dryer is disclosed. The clothes dryer comprises an outer body having a hatch door and a tumbler disposed within the outer body coupled to the hatch door. The system further comprises a screen-free, liquid-based lint collection system. The lint collection system comprises an initial air-lint conduit fluidically coupled to the tumbler. The lint collection system also comprises a lint-collection reservoir coupled to the initial air-lint conduit and a spray assembly that sprays liquid into the lint-collection reservoir. A sensor monitors the level of the liquid collected in the lint-collection reservoir.

These and other features, advantages, and objects of the present invention will be further understood and appreciated by those skilled in the art by reference to the following specification, claims, and appended drawings.

BRIEF DESCRIPTION OF THE DRAWINGS

For the purpose of illustrating the invention, exemplary embodiments are shown in the drawings. It should be understood, however, that the invention is not limited to the precise arrangements and instrumentalities shown. The following detailed description of the invention, will be better understood when read in conjunction with the appended drawings.

FIG. 1 is a schematic of a screen-free, liquid-based lint collection system shown in a front view of a partially assembled clothes dryer configured to deliver a filtered air to a blower;

FIG. 2 is a cross-sectional view of the lint collection system shown in FIG. 1, taken along line 2-2 of FIG. 1;

DETAILED DESCRIPTION

Figure 4:
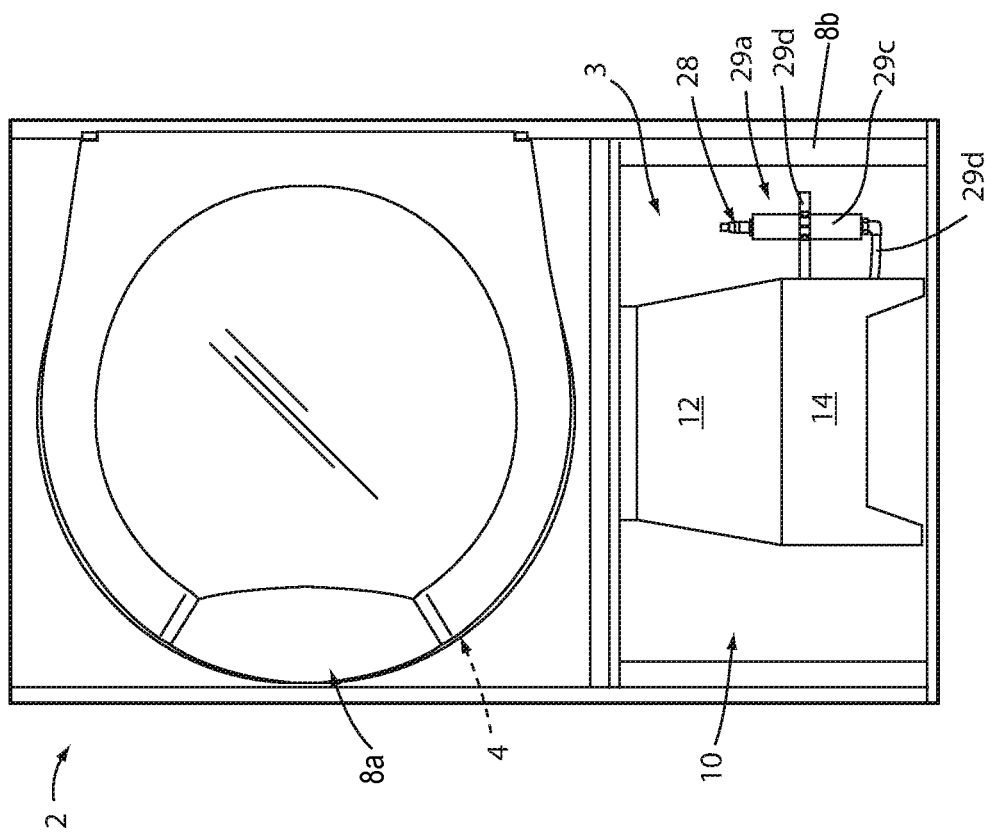
FIG. 4 is a front view of the clothes dryer demonstrating a lint collection system.
Figure 3:
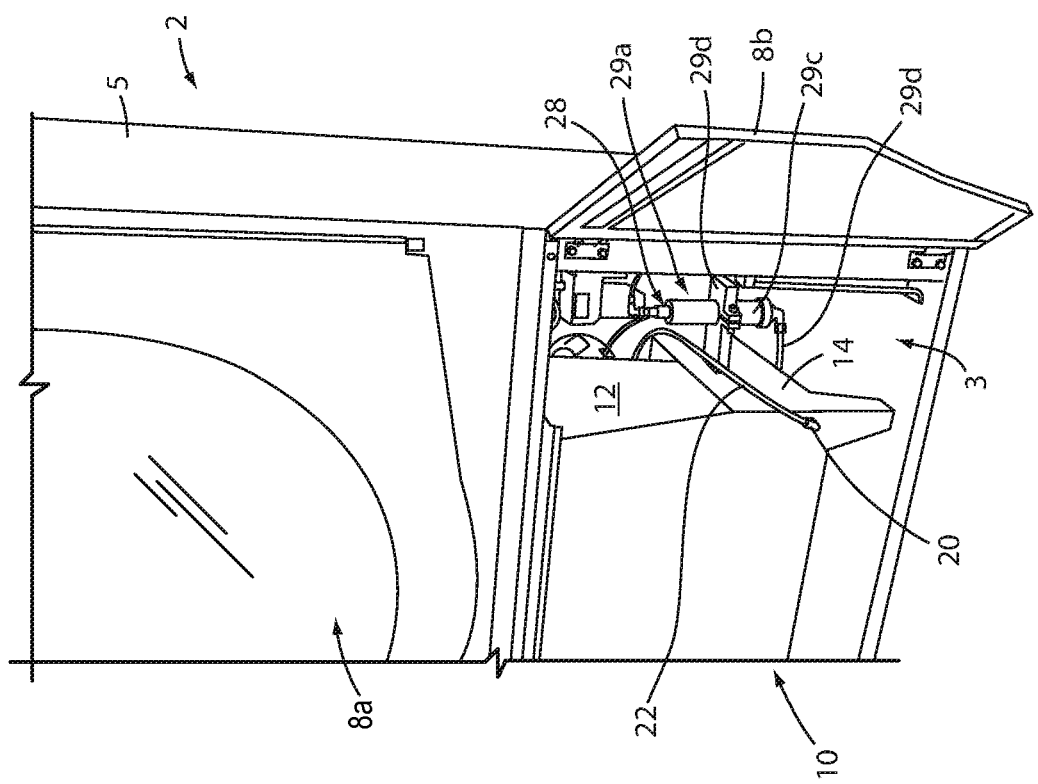
FIG. 3 is a partial front perspective view of a clothes dryer demonstrating a lint collection system.

Reference will now be made in detail to the embodiments of the invention illustrated in the accompanying drawings. Wherever possible, the same or like reference numbers will be used throughout the drawings to refer to the same or like features. It should be noted that the drawings are in simplified form and not drawn to a precise scale.

In reference to the disclosure herein, for purposes of convenience and clarity only, directional terms such as top, bottom, above, below, proximal, distal, and transverse, are used with respect to the accompanying drawings. Such directional terms used in conjunction with the following description of the drawings should not be construed to limit the scope of the invention in any manner not explicitly set forth herein. Unless specifically set forth herein, the terms "a", "an" and "the" are not limited to one element but instead should be read as meaning "at least one". The terminology includes the words noted above, derivatives thereof and words of similar import. It should also be noted that the terms "first", "second", "third", "upper", "lower", and the like may be used herein to modify various elements. These modifiers do not imply a spatial, sequential, or hierarchical order to the modified elements unless specifically stated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Lint, also known as fluff, is generally defined as the visible accumulation of fibers, hair, dust, and other materials that comes from clothing. Certain materials used in clothing manufacture, e.g., cotton, linen, and wool, contain very short fibers, are easily released while worn due to movement, frictional interference, etc. The short fibers attach to the outer and inner surfaces of clothing—where lint buildup occurs.

Dryer lint is a type of lint, which results when clothes are tumbled during a drying cycle. Tumbling of clothes acerbates the release of clothing fibers—resulting in additional accumulation of lint. Generally, when clothes are dried using a clothes dryer, lint will accumulate.

In a traditional clothes dryer, the accumulation of dryer lint is captured in a designated area, using a screen filter. It is recommended that a screen filter be cleaned after every drying cycle for dryer safety and efficiency. Dryer lint is highly flammable and if not regularly removed from the dryer, the potential for a fire hazard increases.

In a typical household, the average clothes dryer will dry almost five-hundred (500) loads of laundry each year. During each load dryer lint accumulates. And although regular and frequent removal of dryer lint helps, most screen filters only capture a low percentage of dryer lint. For dryers used in commercial settings, however, the cleaning of lint filter screens is typically not very frequent, further increasing the risk of a fire, while simultaneously decreasing dryer performance.

In addition to causing a fire hazard, dryer efficiency will decrease when the accumulation of dryer lint is not regularly and frequently removed. But, just the use of a lint filter screen in and of itself, although very useful in preventing fires, also negatively affects dryer efficiency. Lint filter screens restrict air flow within a dryer. Moreover, as lint accumulates on a lint screen filter, airflow is further restricted. And when dryer efficiency decreases, the longer it takes for clothes to dry.

To address the various issues raised by dryer lint accumulation, it may be useful to provide an improved system for lint removal. Such a system may be sold as an aftermarket item and are external to the clothes dryer. The disclosure provides for a screen-free, liquid-based lint collection system for clothes dryers. The present invention fulfills various needs, and provides further related advantages as described below.

Disclosed herein is a screen-free, liquid-based lint collection system and methods to be utilized in clothes dryers. Each type of lint collection system disclosed herein collects lint in such a way that the amount of collected lint has a lessened effect on airflow and/or dryer performance when compared to clothes dryers that include traditional lint screen filters. The disclosed systems may also flush and replenish liquid automatically.

In contrast to other liquid-based lint collection systems, the lint collection systems described herein may eliminate a need for a screen filter and automatically clean or flush lint. The lint collection systems may be incorporated as an integral component of a clothes dryer and allow exhausted air to be vented outdoors. Finally, the disclosed lint collection systems may provide for improved efficiency and may not adversely affect dryer performance.

Referring to FIGS. 1-5, views of an exemplary embodiment of a screen-free, liquid-based lint collection system 10 are shown. The lint collection system 10 is configured to filter lint 6 from an air-lint combination 1a upstream from a fan/blower 30 (FIG. 2). The lint collection system 10 may be disposed within a clothes dryer 2 in a designated area 3 of the clothes dryer 2. The clothes dryer 2 may include any and all elements typically included in clothes dryers that dry clothing, particularly clothes dryers using a combination of air and tumbling. Components of the clothes dryer 2, therefore, may include a tumbler 4, an outer body 5, a hatch door 8a (FIGS. 3 and 4), an access door 8b (FIGS. 3 and 4), and one or more control systems 9, 270 for the dryer 2 and/or the lint collection system 10. The control system 270 for the lint collection systems is further discussed in reference to FIG. 13.

In an exemplary embodiment, the lint collection system 10 may be positioned in a designated area 3, accessible via the access door 8. The designated area 3 may be located under the tumbler 4 of the dryer 2. In this arrangement, the air-lint combination 1a may efficiently pass into the lint collection system 10 such that the lint 6 may be filtered from the combination 1a prior to passing into the fan/blower 30, which may also be located in the designated area 3.

The lint collection system 10 includes an initial air-lint conduit 12, which is fluidically coupled to the tumbler 4 such that the air-lint combination 1a contained within the tumbler 4 flows to the conduit 12. The lint collection system 10 further includes a lint-collection reservoir 14, which is coupled to the initial air-lint conduit 12. The reservoir 14 may be supplied with a liquid 7 from at least one nozzle 20. The liquid 7 may be delivered to the reservoir and serve as a filtration mechanism to remove the lint 6 from the air-lint combination 1a and flush the lint 6 from the reservoir 14.

As the air-lint combination 1a is directed into the reservoir 14, the lint 6 adheres to a surface 7a of the liquid 7 accumulated in the reservoir 14. The lint may also accumulate against the inner walls 16 of the reservoir 14. During use of the system 10, the liquid 7 may be directed into the reservoir 14 via a spray assembly 18. In an exemplary embodiment, the at least one nozzle 20 of the spray assembly 18 may correspond to a plurality of nozzles 20 (e.g. 4 nozzles). As illustrated, each of the nozzles 20 may be supplied with the liquid 7 via hoses 22, a valve 24, and an inlet connection 26 of the spray assembly 18.

In an exemplary embodiment, the liquid 7 is water. However, other liquids may similarly be utilized in the system 10. For example, in some embodiments, a solvent or liquid solution may be utilized. Additionally, the liquid 7 may contain additives that facilitate the degradation of the lint 6.

After the collected liquid 7b is drained, the liquid 7 may continue to be supplied into the reservoir 14 via the nozzles 20 to rinse off lint 6, which has accumulated against the inner walls 16. The rinsing action may force the lint 6 to flow to the surface 7a, such that the lint 6 adheres to the surface 7a of the collected liquid 7b at the bottom of the reservoir 14. The level of the surface 7a of the collected liquid 7b may be controlled by the system 10 to ensure that the level of the collected liquid 7b is maintained at a predetermined range for the filtering of the lint 6. A base 27 of the reservoir 14 may be pitched. In an exemplary embodiment, a pitch angle $\beta$ of the base 27 may range from about 5°-10° and may provide for improved draining of the reservoir 14.

In order to maintain the level of the surface 7a of the collected liquid 7b, the system 10 may comprise a switch/sensor 28. When the level of the collected liquid 7b reaches a first predetermined threshold, the valve 24 will close to stop the supply of the liquid 7. Conversely, if the level of the collected liquid 7b is not sufficient for operation, the switch/sensor 28 will detect that the level of the collected liquid 7b is below a second predetermined threshold, and the system 10 will control the valve 24 to open. Data outputted by the switch/sensor 28 is received by a control system 9 for the dryer 2 and/or a control system 270 for the lint collection system 10.

The switch/sensor 28 may correspond to various forms of switching and/or sensory devices. Some devices may include a float, a sonic sensor, a hydrostatic sensor (e.g. a displacer, a bubbler, a pressure transducer, etc.), a magnetic level gauge, and/or various level sensing devices. The switch/sensor 28 may be disposed in an auxiliary column 29a in fluid communication with the collected liquid 7b via a sight glass tube 29b. The auxiliary column 29a may correspond to a sight glass 29c configured to provide a visual indication of the level of the surface 7a of the collected liquid 7b. The auxiliary column 29a may be secured to the reservoir via a mounting bracket 29d. In this configuration, the operation system 10 may be configured to accurately control the level of the surface 7a and may be verified visually.

With the level of the surface 7a of the collected liquid 7b controlled, the system 10 may effectively filter the lint 6 from the air-lint combination 1a. As the air-lint combination 1b passes over the liquid 7 in the reservoir 14, a significant portion of the lint 6 from the air-lint combination 1a is trapped by the liquid 7. In this way, a filtered air 1b is produced. The filtered air 1b is routed to the fan/blower 30 via an air passageway 32 positioned between the air-lint conduit 12 and the fan/blower 30, as shown in FIG. 2. After the filtered air 1b has been routed through the fan/blower 30, the air 1b exits through an outlet conduit 38 to the atmosphere A, outside of the dryer 2.

With respect to the collected liquid 7b and lint 6, a pump 34 is coupled to the lint collection reservoir 14 to pump away lint 6 contained in the collected liquid 7b that accumulates into the reservoir 14. The pump 34 is coupled to the reservoir 14 by a drain/suction tube 35. The pump 34 is also connected to a discharge port 36 that discharges the lint 6 to a waste receptacle (not shown). Power to the pump 34 and/or to the control system 9, 270 may be supplied via a separate power supply or directly from the dryer wiring itself.

Figure 5:
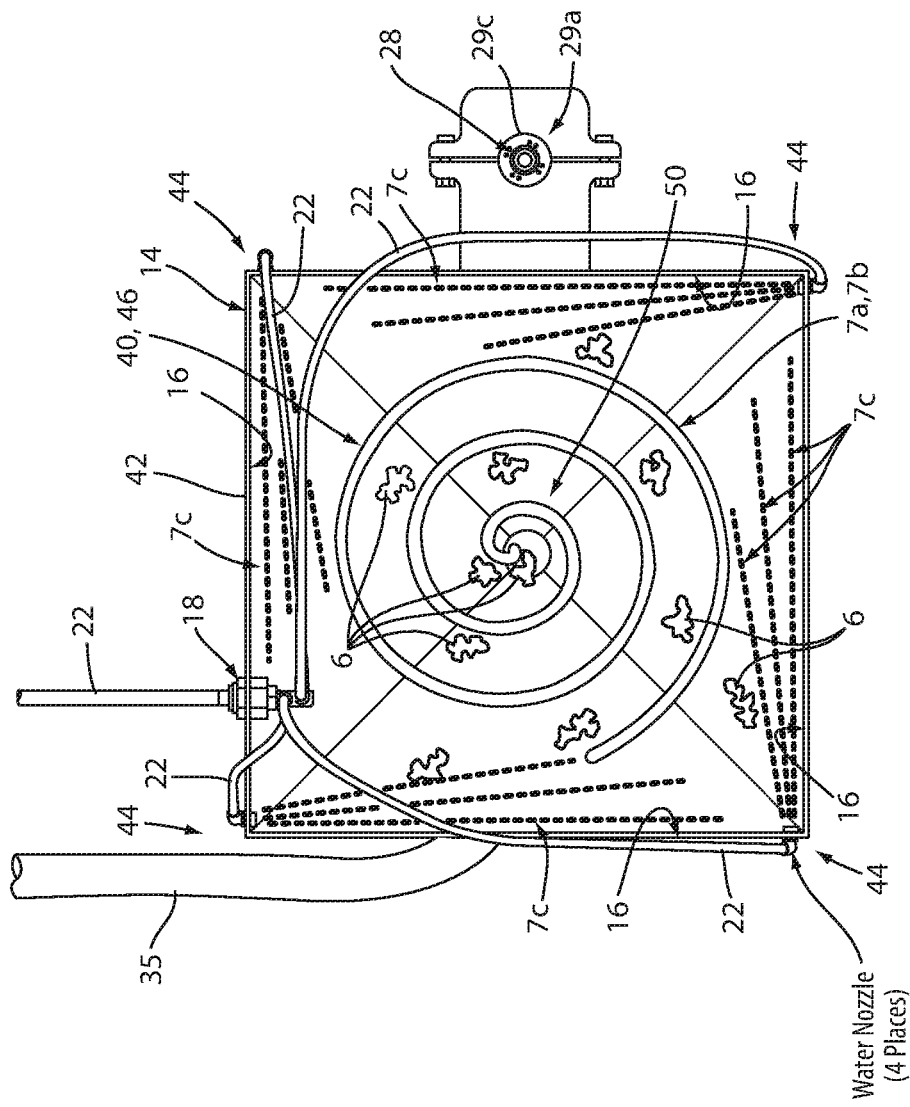
FIG. 5 is a partial top view of a lint-collection reservoir of a lint collection system.

Referring now to FIG. 5, the nozzles 20 of the system 10 may be configured to flush the lint 6 from the inner walls 16 of the reservoir 14 via a vortex action 40. The vortex action 40 may be produced by a flow of the liquid 7 entering the reservoir 14. In an exemplary embodiment, each of the four nozzles 20 may pass through a wall 42 of the reservoir 14 proximate a corner portion 44. Each of the nozzles 20 may be directed in complementary directions within the reservoir 14 to produce a rotational flow direction 46 of the collected liquid 7b. For example, a sprayed liquid 7c may be projected from each of the nozzles 20 to generate a clockwise rotation or a counter-clockwise rotation 48 of the vortex action 40. The counter-clockwise rotation 48 of the vortex action 40 is shown in FIG. 5 as an exemplary embodiment.

The vortex action 40 produced in the reservoir 14 may provide for the directional flow of the lint 6 in the collected liquid 7b. The directional flow may enhance the efficiency of a removal of the lint 6 from the reservoir by pushing the lint 6 toward a central portion 50 of the reservoir 14. In this configuration, the lint 6 captured in the collected liquid 7b may flow toward the drain/suction tube 35. The lint collection system 10 may provide for the efficient collection of the lint 6 that is captured in the reservoir 14 such that the lint 6 is effectively removed from the reservoir 14 by the pump 34.

Referring back to FIG. 2, as discussed above, the air-lint combination 1a is directed into the reservoir 14 from the tumbler 4. To ensure that the air-lint combination 1a enters the reservoir 14 efficiently, an inlet elbow 52 may be utilized to interconnect the tumbler 4 and the reservoir 14. The inlet elbow 52 may have a substantially rectangular form and correspond to the conduit 12 extending into the reservoir 14. Additionally, the inlet elbow 52 may comprise at least one angled or contoured wall 54 configured to direct the flow of the air-lint combination 1a across the surface 7a. The efficient delivery of the air-lint combination 1a into the reservoir may include introducing the air-lint combination 1a over the surface 7a without generating splashing of the collected liquid 7b.

The efficiency of the passage of the air-lint combination 1a into the reservoir may also be controlled by an inlet space 56 between an end portion 58 of the inlet elbow 52 relative to the level of the surface 7a. The inlet space 56 may vary based on the proportions of the inlet elbow 52 relative to the rate of circulation of the air in the tumbler 4 and the corresponding flow rate of the air-lint combination 1a through the inlet space 56. In an exemplary embodiment, the inlet elbow 52 may extend at least partially into the reservoir 14 and form a reservoir space between the inlet elbow 52 and the inner walls 16 of the reservoir 14. In this configuration, the air-lint combination 1a may enter the reservoir 14, pass over the surface 7a of the collected liquid 7b, and the filtered air 1b may be passed outward through the reservoir space.

Figure 8:
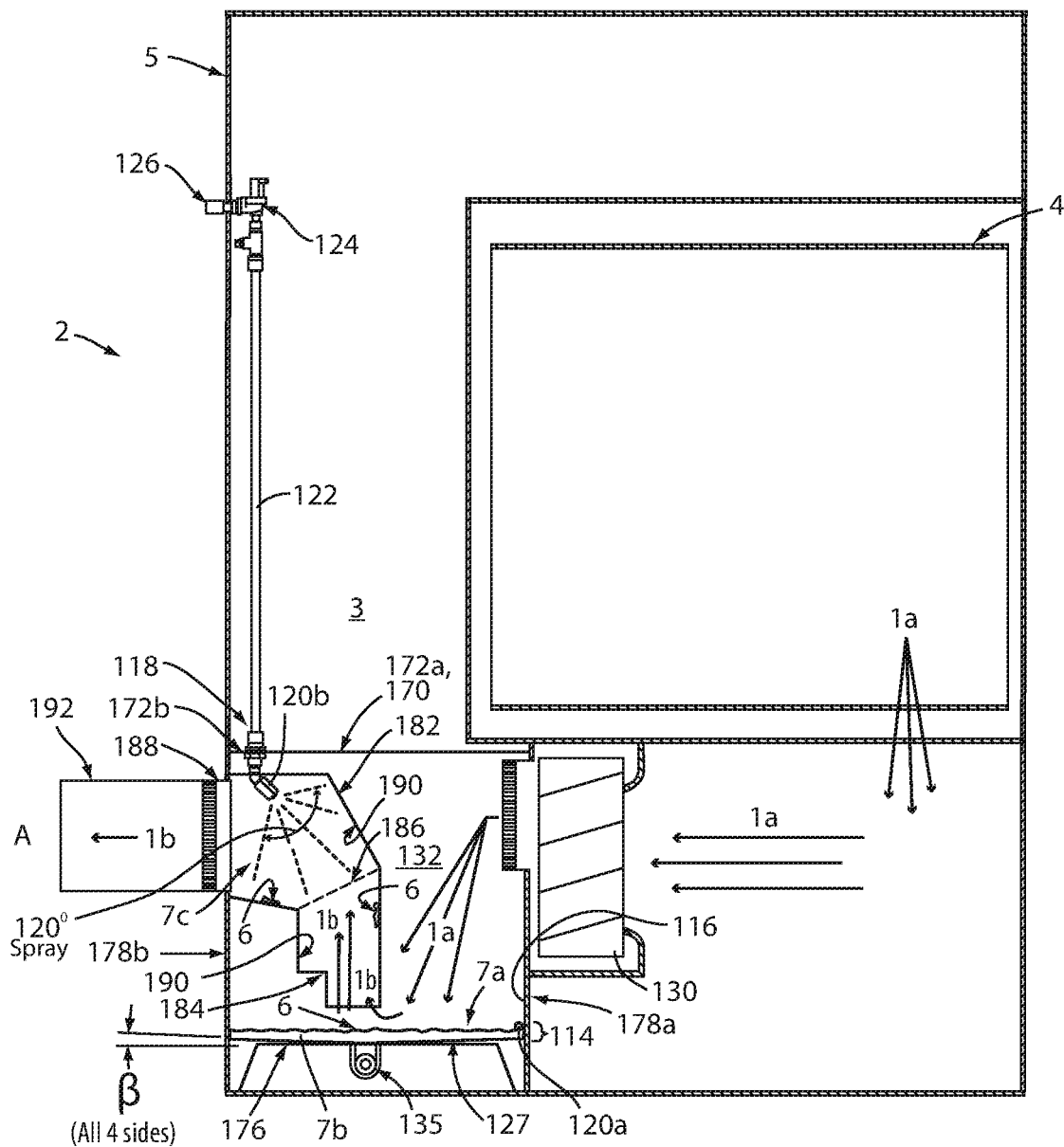
FIG. 8 is a partial side cross-sectional view of the lint collection system, taken along line VII-VII of FIG. 7.

Referring to FIGS. 6-9B, an embodiment of a screen-free, liquid-based lint collection system 110 is shown. The lint collection system 110 is configured to filter lint 6 from an air-lint combination 1a downstream from a fan/blower 130 (FIG. 8). The system 110 collects lint 6 after an air-lint combination 1a leaves a fan/blower 130 disposed within the dryer 2. Reference numerals of the second embodiment are distinguishable from those of the first embodiment by a factor of one-hundred (100), but otherwise indicate the similar elements as indicated in the embodiment 10, except as otherwise specified. The description of certain similarities between all embodiments described herein may be omitted for the sake of clarity, and, therefore, is not limiting.

In the lint collection system 110, after the air-lint combination 1a passes through the tumbler 4, the air-lint combination 1a flows over collected liquid 7b before flowing through a specially designed interior conduit 182 or an outlet elbow. The specially designed interior conduit 182 includes a stepped entry region 184, an angled transition region 186, and an outlet region 188. As the air-lint combination 1a passes over the collected liquid 7b, lint 6 collects onto the liquid surface and may accumulate or "stick" onto inner surfaces 190 of the interior conduit 182.

The system 110 may be disposed within a clothes dryer 2 in a designated area 3 of the clothes dryer. The lint collection system 110 may be contained within a system chamber 170. The system chamber 170 may include a top 172 having a front section 172a and a rear section 172b, sidewalls 174a, 174b, a base 176, a front wall 178a, and a rear wall 178b. The interior 180 of the system chamber 170 acts as both a reservoir and an air passageway for the air-lint combination 1a. Specifically, the chamber 170 includes a bottom reservoir section 114 and an air flow area 132 such that the air-lint combination 1a flows through the system 110 and filtered air 1b flows out into an outlet exhaust line 192 and thereafter to the atmosphere A, as shown particularly in FIG. 8.

During use of the system 110, sprayed liquid 7c is sprayed into the interior conduit 182 via a spray assembly 118 routed through the rear section 172b of the top 172. The spray assembly 118 includes at least one nozzle 120 connected to a supply of the liquid 7 via a hose 122, a valve 124, and an inlet connection 126. The at least one nozzle 120 may correspond to a plurality of nozzles 120a configured to generate the vortex action 40 as discussed in reference to FIG. 5. The liquid sprayed from the nozzles 120 may rinse lint 6 from the inner walls 116 of the reservoir 114.

Figure 6:
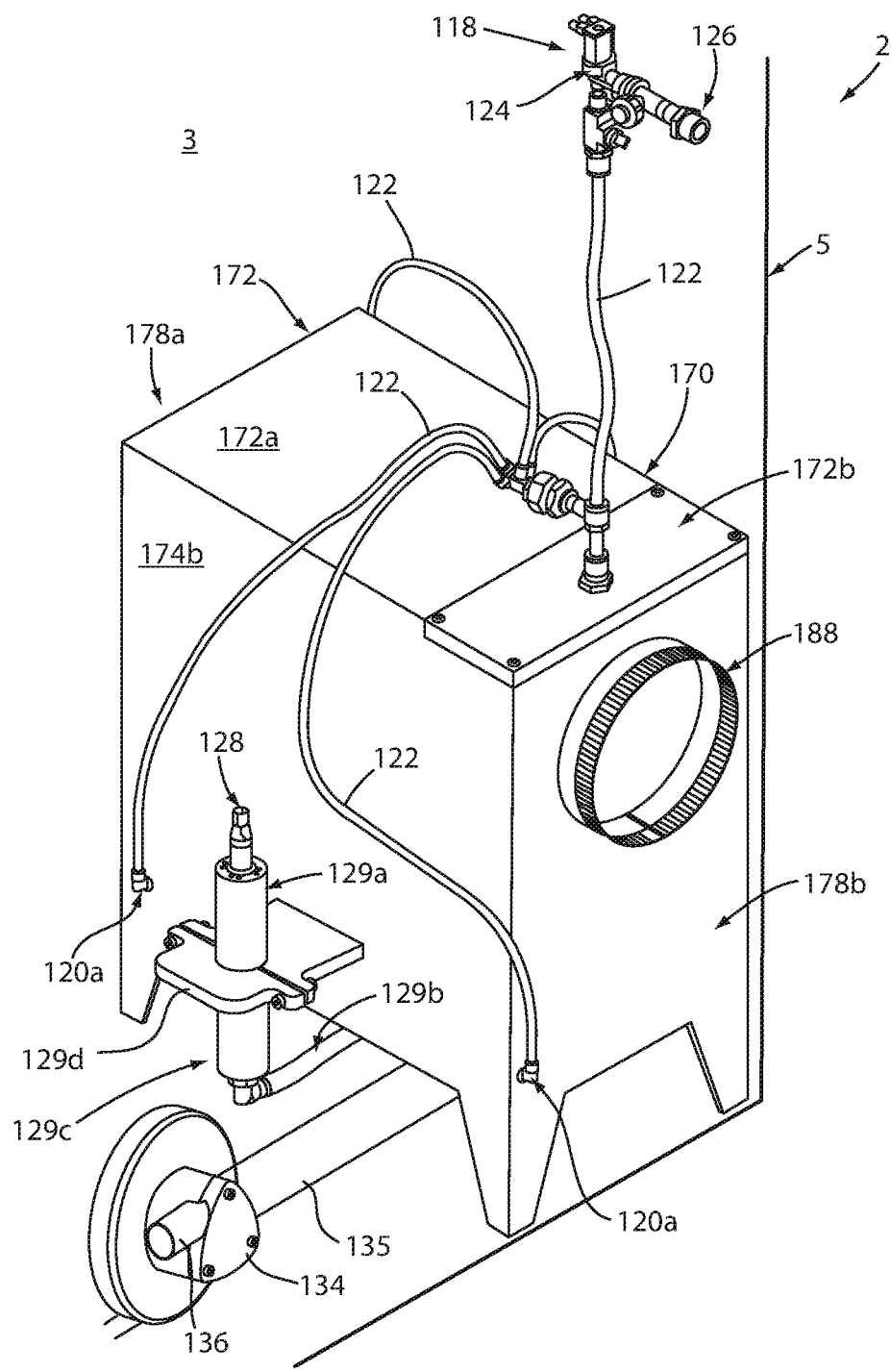
FIG. 6 is a partial rear perspective view of the lint collection system configured to receive an air-lint combination from an outlet of a blower.
Figure 7:
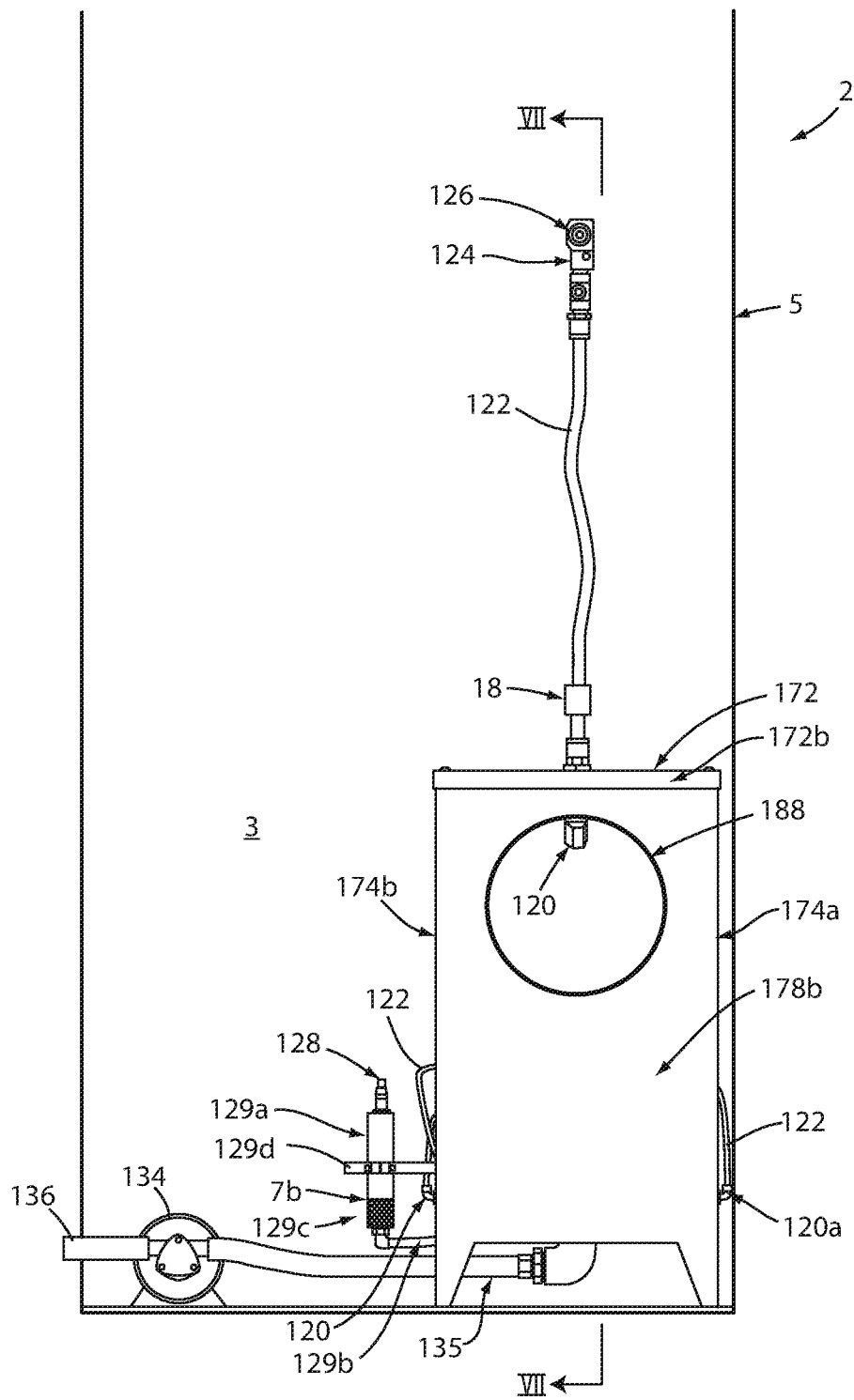
FIG. 7 is a schematic of a screen-free, liquid-based lint collection system of FIG. 6 shown in a partial rear view.

The system 110 may comprise a nozzle 120b disposed in the interior conduit 182. The nozzle 120b may be configured to rinse the lint 6 accumulated against the inner surfaces 190 of the interior conduit 182. In this configuration, the lint 6 accumulated against the inner surfaces 190 may be deposited on the surface 7a of the collected liquid 7b at the bottom of the reservoir section 114. The nozzle 120b may be configured to produce the sprayed liquid 7c, having at least a 120-degree spray angle, as shown in FIG. 6. In this configuration, the nozzles 120 may be configured to significantly remove the lint 6 from the inside of the reservoir 182 to prevent buildup.

The system 110 may also comprise a switch/sensor 128 configured to monitor the level of the collected liquid 7b within the system 110. When the level of the collected liquid 7b has reached a predetermined threshold, the valve 124 will close. Conversely, if the level of the collected liquid 7b is not sufficient for operation of the system, the valve 124 will open. This procedure will repeat, as determined by the control system 9 for the dryer and/or the control system 270 for the lint collection system 110. A base 127 of the reservoir 114 may be pitched. In an exemplary embodiment, a pitch angle β of the base 127 may range from about 5°-10° and may provide for improved draining of the reservoir 114.

With respect to the collected liquid 7b and lint 6, a pump 134 (FIG. 6) is coupled to the system chamber 170 via a drain/suction tube 135 to pump away lint 6 contained in the collected liquid 7b. The drain/suction tube 135 is connected to a discharge port 136 that discharges the lint to a waste receptacle (not shown). Power to the pump 134 and/or to the control system 9 of the dryer 2 or the lint collection system 110 can be supplied via wiring.

Figure 9B:
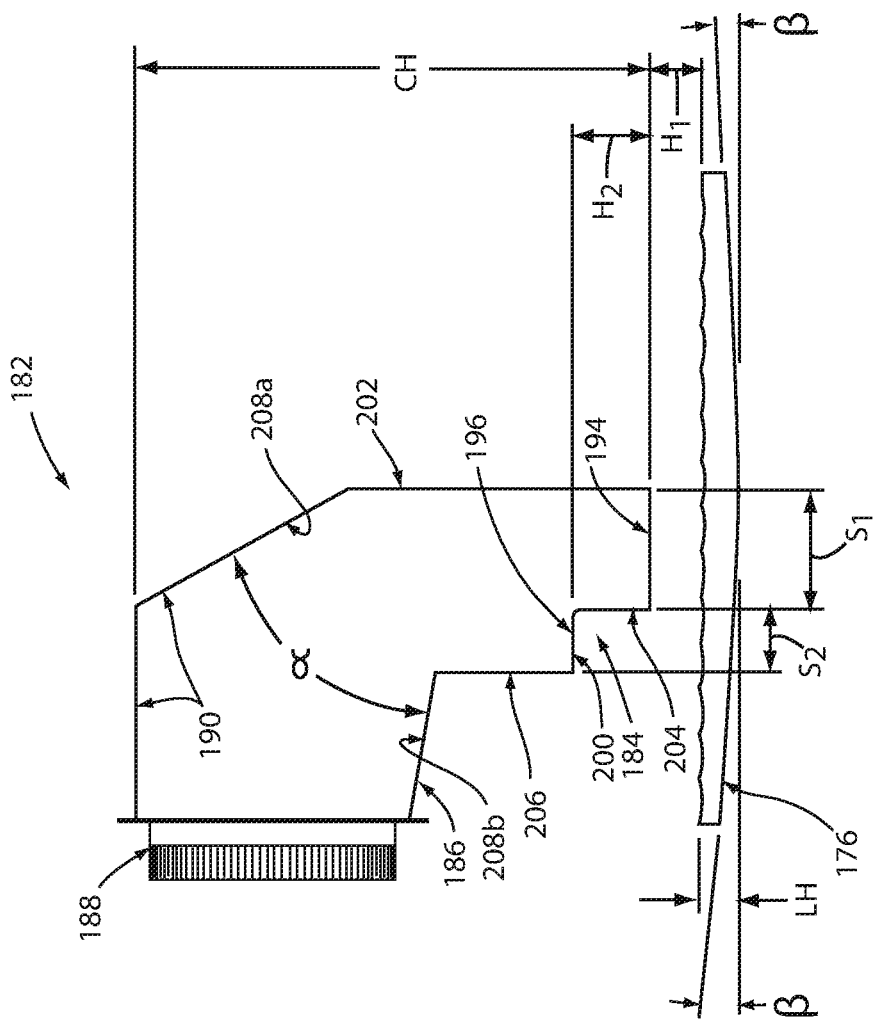
FIGS. 9A and 9B are projected side views of an air-lint conduit incorporated into the lint collection system.
Figure 9A:
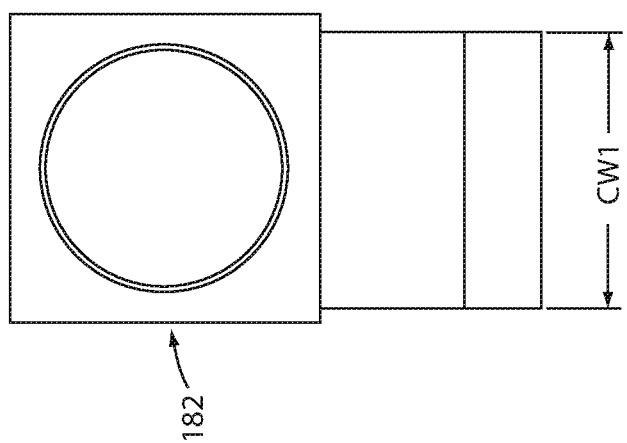

Referring to FIG. 9 a detailed view of the interior conduit 182 is shown that further demonstrates the stepped entry region 184 and the angled transition region 186. The interior conduit has an overall conduit height CH, and conduit width, $CW_1$. The stepped entry region 184 includes a plurality of stepped sections, including but not limited to a first stepped section 194 and a second stepped section 196. The first stepped section 194 may be defined with respect to a predetermined height of the liquid, LH, a first stepped section height $H_1$, where LH is generally measured from the bottom 176 of the system chamber 182 to the surface of the first stepped section 194.

The second stepped section 196 may be defined with respect to the first stepped section 194 and a second stepped section height $H_2$, wherein $H_2$ is generally measured from the bottommost edge 200 of the second stepped section 196. The first stepped section 194 may also be defined with respect to a first side width $S_1$ measured from a rear edge 202 of the interior conduit 182 to a first edge 204. The second stepped section 196 is further defined with respect to a second side width $S_2$ measured from the first edge 204 to an inner edge 206. The angled transition region 186 is defined, in part, by the angular distance a measured between angled interior surfaces 208a, 208b.

Figure 10:
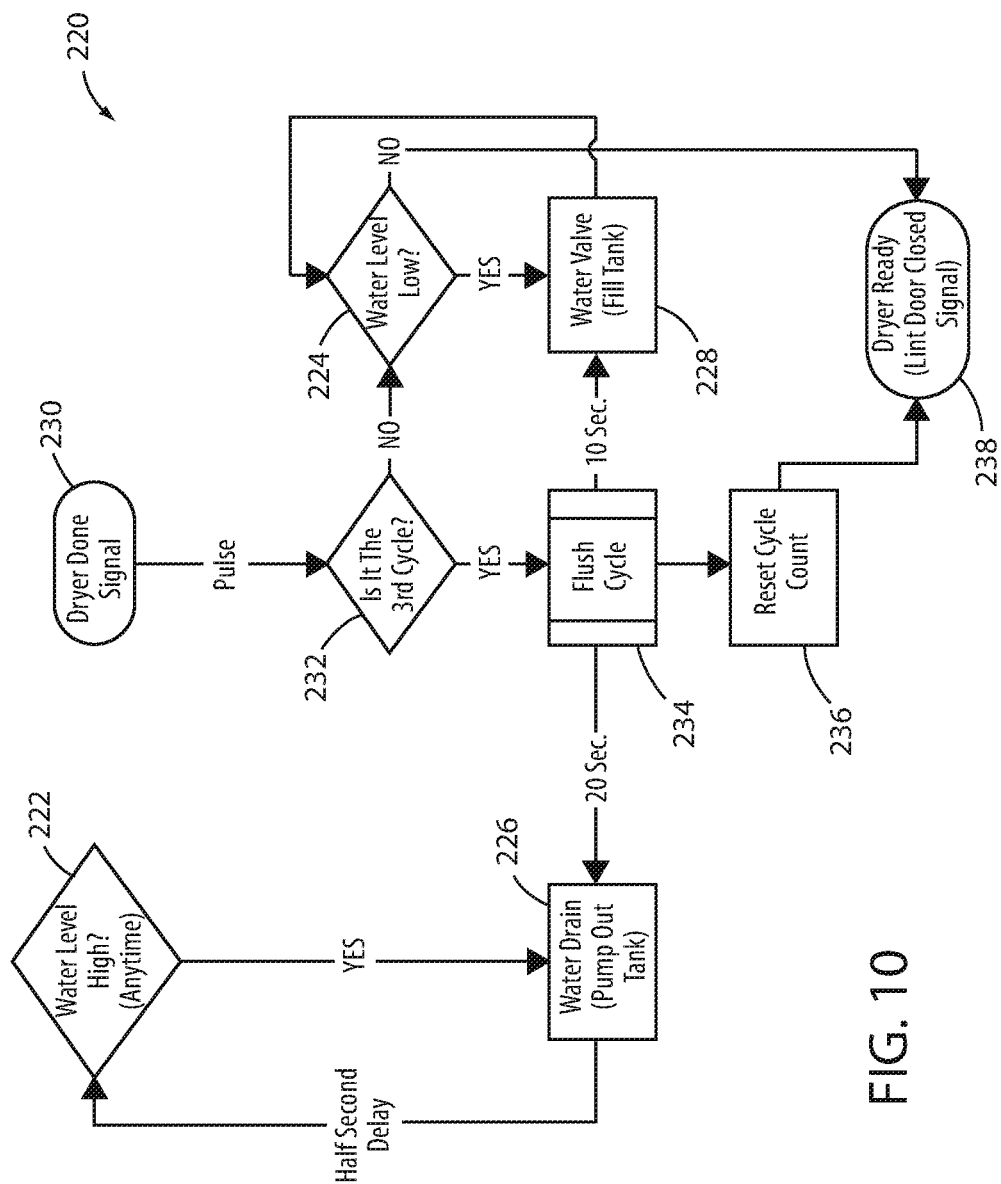
FIG. 10 is a flowchart of a method of operation used for the lint collection systems disclosed herein.
Figure 11:
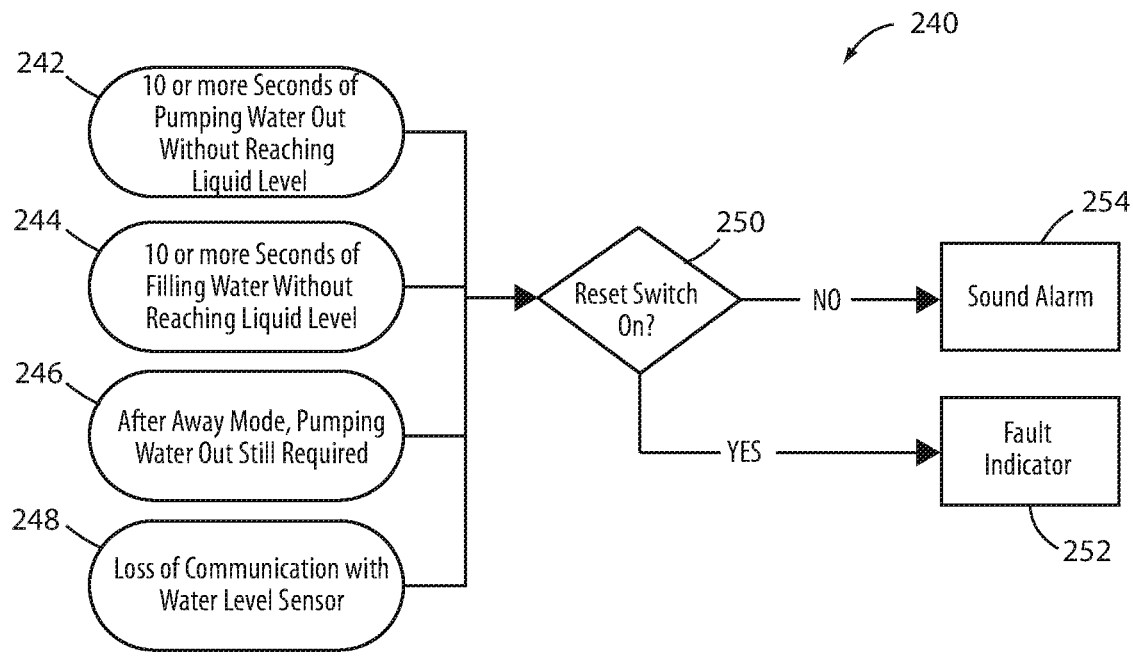
FIG. 11 is a flowchart of a method of operation used for the lint collection systems disclosed herein.
Figure 12:
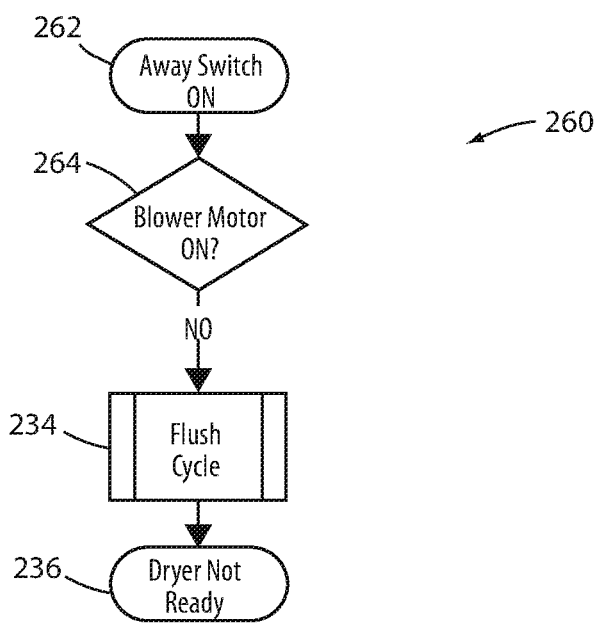
FIG. 12 is a flowchart of a method of operation used for the lint collection systems disclosed herein.

FIGS. 10-12 demonstrate flowcharts for methods of operation that may be used for the lint collection systems 10 and 110. Referring to FIG. 10, a method 220 for general operation is shown. During normal operation, the systems 10 and 110 may monitor the switch/sensors 28 and 128 to determine if the level of the surface 7a of the collected liquid 7b is high (222). Similarly, the systems 10 and 110 may monitor the switch/sensors 28 and 128 to determine if the level of the surface 7a of the collected liquid 7b is low (224). In response to identifying that the level of the collected liquid 7b is high in step 222, the control system 9, 270 may activate the pump 34, 134 to pump out the collected liquid 7b and lower the level of the surface 7a (226). The control system 9, 270 may monitor the level of the surface 7a periodically, until it is determined that the level of the surface is approximately at a first predetermined threshold.

In response to identifying that the level of the collected liquid 7b is low in step 224, the control system 9, 270 may control the valve 24, 124 to open to pump liquid 7 into the reservoir 14, 114 (228). The control system 9, 270 may monitor the level of the surface 7a periodically, until it is determined that the level of the surface is approximately at a second predetermined threshold. The control system 9, 270 may continue to monitor the level of the collected liquid 7b throughout operation of the systems 10, 110 to ensure that the level of the collected water 7b is maintained between the first and second predetermined thresholds.

The method 220 also provides for a flush cycle to clean the reservoir periodically during operation. The control system 9, 270 may determine a timing of a flush cycle based on a dryer done signal 230. In response to the dryer done signal in step 230, the control system 9, 270 may check a counter to determine if a predetermined number of drying cycles have been completed (e.g. three drying cycles) (232). If the predetermined number of drying cycles have not been completed, the control system 9, 270 may move to step 224. If the predetermined number of drying cycles have been completed, the control system 9, 270 may begin a flush cycle (234).

The flush cycle 234 may begin by the controller activating the pump 34, 134 to drain the reservoir 14, 114. After the collected liquid 7b is drained the control system 9, 270 may supply liquid into the reservoir 14 via the nozzles 20, 120 to rinse off lint 6, which has accumulated against the inner walls 16, 116. The rinsing action may force the lint 6 to flow to the surface 7a of the collected liquid 7b at the bottom of the reservoir 14. The control system 9, 270 may continue to activate the pump 34, 134 and control the valve 24, 124 to supply the liquid to rinse the reservoir 14, 114 for a predetermined period of time.

Upon completion of the flush cycle 234, the control system 9, 270 may reset the cycle count (236). Following the flush cycle 234, the control system 9, 270 may set a dryer ready signal such that the next drying cycle may be initiated (238). The method 220 may provide for robust operation of the systems 10, 110. The operation of the system 10, 110 may also contemplate various faults that may occur during operation.

Referring now to FIG. 11, a fault detection method 240 for detecting one or more faults for the liquid-based lint collection system 10 with the control system 9, 270 is shown. In response to various detected conditions, the control system 9, 270 may activate a fault or alarm. For example, the control system 9, 270 may identify a fault condition in response to the pump 34, 134 being active for a predetermined time (e.g. 10 or more seconds) without the level of the collected liquid 7b reaching a predetermined level (242). The control system 9, 270 may also identify a fault condition in response to the control the valve 24, 124 being open to pump liquid 7 into the reservoir 14, 114 for a predetermined time (e.g. 10 or more seconds) without the level of the collected liquid 7b reaching a predetermined level (244).

In some embodiments, the control system 9, 270 may also identify a fault condition in response to the pump 34, 134 being activated after an away mode method 260 is performed as discussed in reference to FIG. 12 (246). Additionally, the control system 9, 270 may identify a fault condition in response to a loss in communication with the switch/sensors 28 and 128 (248). In response to the fault conditions 242-248, the control system 9, 270 may determine if a reset switch is on (250).

If the reset switch is on, the control system 9, 270 may activate a fault indicator (252). The fault indicator may correspond to an indicator light (e.g. a light emitting diode [LED] light). If the reset switch is not on, the control system 9, 270 may activate an audible alarm (254). Once activated, the fault condition of the lint collection system 10, 110 may remain enabled until an authorized service representative resolves the fault that led to the fault condition.

Referring now to FIG. 12, a method for conditioning the lint collection system 10, 110 for a period of non-use is described as an away mode method 260. The control system 9, 270 may be requested to initiate the away mode method 260 in response to the activation of an away switch (262). The control system 9, 270, may then detect if the fan/blower 30 is active (264). If the fan/blower 30 is active, the away mode may be delayed until the fan/blower 30 is inactive. If the control system 9, 270 identifies that the fan/blower 30 is inactive, the flush cycle 234 may be initialized. Upon completion of the flush cycle 234, the lint collection system 10, 110 may be placed in a 'not ready' mode that may also deactivate the dryer 2 (266). In the 'not ready' mode, the reservoir 14, 114 may be left empty until the away mode switch is deactivated. Once the away mode is deactivated, the control system 9, 270 may begin normal operation by filling the reservoir to the predetermined level.

Figure 13:
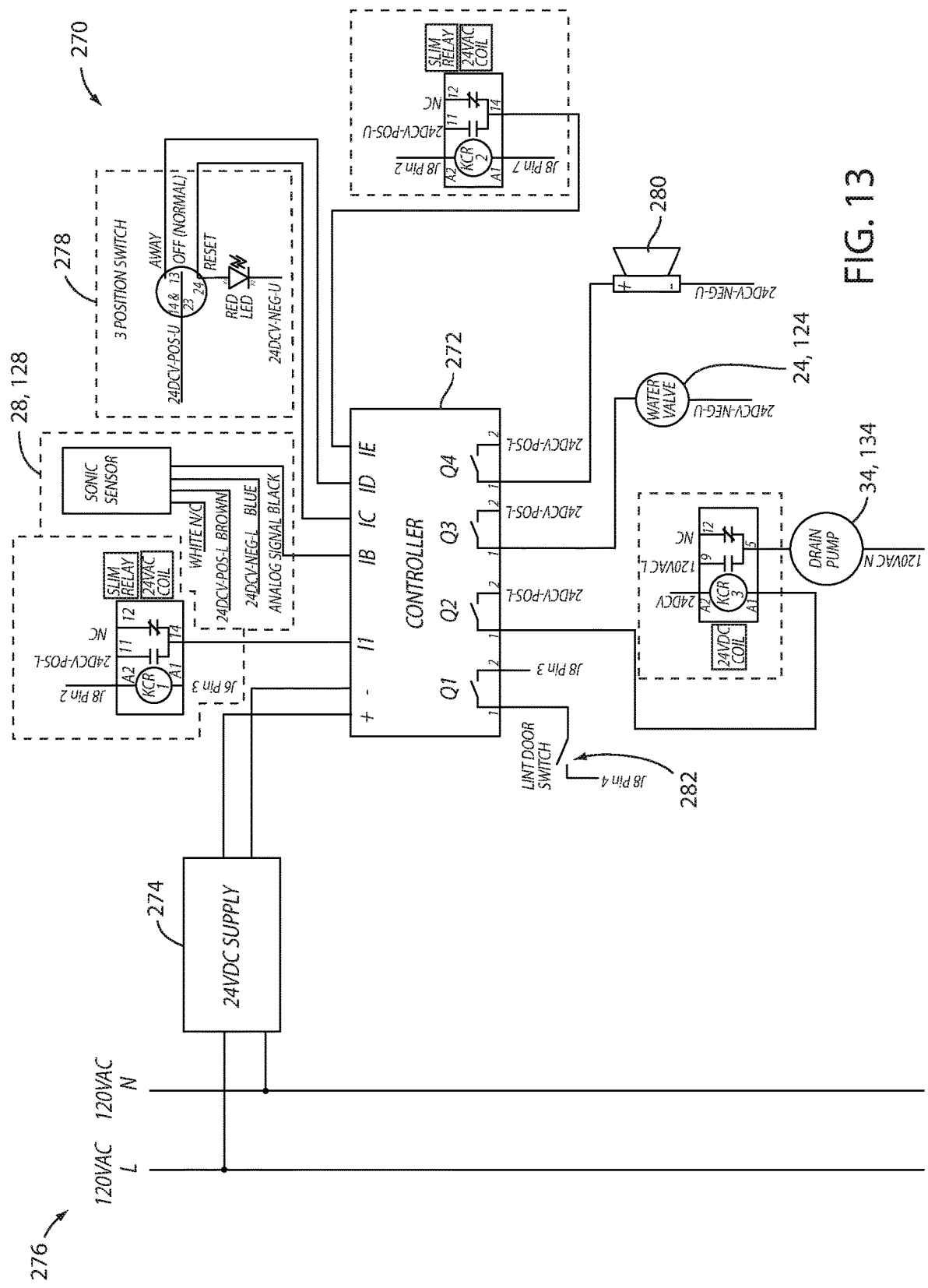
FIG. 13 is a schematic diagram of a control system for a lint collection system in accordance with the disclosure.

Referring to FIG. 13, a schematic diagram of the control system 270 is shown. The control system 270 comprises a controller 272, which may correspond to or more processors or circuits configured to control the lint collection system 10, 110. The controller 272 is powered via a power supply 274 that may be configured to convert and supply power from an AC power source 276. The controller 272 is demonstrated in communication with the, switch/sensor 28, 128, the valve 24, 124, and the pump 34, 134. The controller 272 may also be in communication with an operational control switch 278 corresponding the away switch and the reset switch, a speaker 280 configured to output the alarm signal, and an access door switch 282 configured to identify a condition of the access door 8.

The controller 272 may comprise a memory, a plurality of relays and/or input/output (i/o) circuits configured to control the lint collection system 10, 110. As discussed herein, the control system 270 may be integrated all or in part with the control system 9 for the dryer 2. The control system 270 may further be in communication with one or more additional controllers, which may be configured to track a maintenance schedule, or control the functions of a plurality of dryers, for example in a commercial or industrial environment. In this way, the lint collection system 10, 110 may be integrated with a variety of systems to provide efficient operation with improved performance.

The following tables demonstrate an exemplary comparison of dryers with a screen filter compared to dryers including a screen-free, liquid based lint collection system 10, 110 as disclosed herein. The comparison testing was performed on a 50 lb. gas clothes dryers, including a screen filter located in an air path between the tumbler and the fan and a 50 lb. gas clothes dryers, including a screen-free, liquid based lint collection system. For Table 1, the lint was collected after four (4), 45-minute dry cycles. Table 2 demonstrates drying performance metrics for a dryer with a conventional screen and Table 3 demonstrates drying performance metrics for a dryer with a liquid-based lint collection system 10, 110 as disclosed herein.

TABLE 1

Screen Filter Lint Collection vs. Screen-Free, Liquid-Based Lint Collection System 10, 110

|  | Screen Filter Collection | Screen-Free, Liquid-Based Lint Collection System |
|---|---|---|
| Mass of lint collected contained within the dryer (g) | 20.3 | 25.8 |
| Mass of lint collected at exhaust outlet (g) | 24.3 | 14.7 |
| Total Mass of Lint Collected (g) | 44.6 | 40.5 |
| Percentage of lint collected by screen filter collection/screen-free, liquid based collection (%) | 46% | 64% |

TABLE 2

Performance Metrics for Dryer with Conventional Screen Filter
50 lb Gas Dryer (Conventional Screen)
0.6" static pressure, 30 min drying time

| Bone Dry Weight (kg) | 22.7 | Dry Load Retention (%) | 1.0% |
|---|---|---|---|
| Wet Weight (kg) | 36.4 | Water Removed (kg) | 13.4 |
| Finish Weight (kg) | 23 | Water Removal Rate (kg/min) | 0.447 |
|  |  | Burner Efficiency(kJ/kg water) | 4736 |

TABLE 3

Performance metrics for Dryer with Screen-Free, Liquid-Based Lint Collection System 10, 110
50 lb Gas Dryer (Liquid Lint collection) 0.6" static pressure, 30 min drying time

| Bone Dry Weight (kg) | 22.7 | Dry Load Retention (%) | 1.4% |
|---|---|---|---|
| Wet Weight (kg) | 36.4 | Water Removed (kg) | 13.3 |
| Finish Weight (kg) | 23.1 | Water Removal Rate (kg/min) | 0.48 |
|  |  | Burner Efficiency(kJ/kg water) | 4333 |

As the testing indicates, the percentage of lint collected by the screen free, liquid-based lint collection system is significantly greater than the percentage of lint collected using screen filters alone. Moreover, overall Burner efficiency was improved. As demonstrated, the disclosed liquid-based lint collection system 10, 110 may provide various benefits over conventional systems utilizing screens for filtration. The liquid-based lint collection systems 10, 110 as described herein may be configured in various combinations based on the teachings of the disclosure to provide additional benefits without departing from the spirit of the disclosure. In this way, the disclosure provides for flexible systems to improve performance of a filtration system for a dryer.

While embodiments and examples of this invention have been shown and described, nothing in this specification should be considered as limiting. All examples and test data presented are representative and non-limiting. Moreover, the above described embodiments of the invention may be modified or varied, and elements added or omitted, without departing from the invention, as appreciated by persons skilled in the art in light of the above teachings. It is therefore to be understood that the invention is to be measured by the scope of the claims, and may be practiced in alternative manners to those which have been specifically described in the specification without departing from the inventive concepts herein.

The invention claimed is:

1. A lint collection system for a laundry apparatus, comprising:
    an interior conduit in fluid communication with a tumbler, the interior conduit comprising a wall having a plurality of inner surfaces forming an interior volume extending to an end portion, wherein the interior conduit comprises a stepped entry region;
    a lint-collection reservoir configured to retain a liquid at a level relative to a base of the reservoir, wherein the wall is at least partially interposed between the interior volume and the lint-collection reservoir, wherein the end portion extends into the lint-collection reservoir and is configured to transfer air from the tumbler to an exhaust outlet through the lint-collection reservoir, and wherein the end portion is spaced at a predetermined distance from the base portion such that the air passes between the liquid and the end portion and into the lint-collection reservoir; and
    a spray assembly configured to spray a liquid into the interior conduit, wherein the spray assembly comprises at least one spray nozzle configured to spray the liquid on the inner surfaces of the wall.

2. The lint collection system according to claim 1, further comprising a pump coupled to the lint-collection reservoir.

3. The lint collection system according to claim 1, further comprising:
    a blower fluidically coupled to the interior conduit.

4. The lint collection system according to claim 3, wherein the blower is configured to force an air-lint combination from a dryer tumbler over the liquid collected into the lint-collection reservoir.

5. A lint collection system, comprising:
    a system chamber, having an inlet that receives an air-lint combination and defining an interior having a reservoir section and an air flow area;
    an interior conduit disposed within the system chamber, wherein the interior conduit comprises a stepped entry region and an outlet region;
    a spray assembly disposed within the interior conduit, wherein the spray assembly sprays liquid into the interior conduit; and
    a sensor that monitors the level of the liquid collected in the reservoir section.

6. The lint collection system according to claim 5, wherein the interior conduit further comprises an angled transition region.

7. The lint collection system according to claim 5, wherein the spray assembly comprises at least one spray nozzle disposed in the interior conduit.

8. The lint collection system according to claim 7, wherein the at least one spray nozzle directs the sprayed liquid to an inner surface of the interior conduit.

9. The lint collection system according to claim 5, wherein the spray assembly comprises a plurality of spray nozzles.

10. The lint collection system according to claim 9, wherein the plurality of spray nozzles are connected to inner walls of the lint-collection reservoir.

11. A clothes dryer, comprising:
    an outer body, having a hatch door;
    a tumbler disposed within the outer body coupled to the hatch door; and
    a liquid-based lint collection system, the lint collection system comprising:
    an interior conduit forming an interior volume fluidically coupled to the tumbler and extending to an end portion, wherein the interior conduit comprises a stepped entry region;
    a lint-collection reservoir coupled to the interior conduit configured to hold a liquid at a level, wherein the end portion of the interior conduit extends into the lint-collection reservoir and is spaced from the level of the liquid forming an airflow path extending from the interior volume of the interior conduit over a surface of the liquid and into the lint-collection reservoir;
    a spray assembly that sprays liquid into the interior conduit, wherein the spray assembly comprises at least one nozzle configured to spray the liquid in the interior volume; and
    a sensor that monitors the level of the liquid collected in the lint-collection reservoir.

* * * * *